March 25, 1969       F. A. DE COSTER       3,435,312

LINEAR MOTOR CONTROL SYSTEM

Filed Feb. 14, 1966

INVENTOR.
FRANK A. DECOSTER

BY *James C. Nemmers*

ATTORNEY

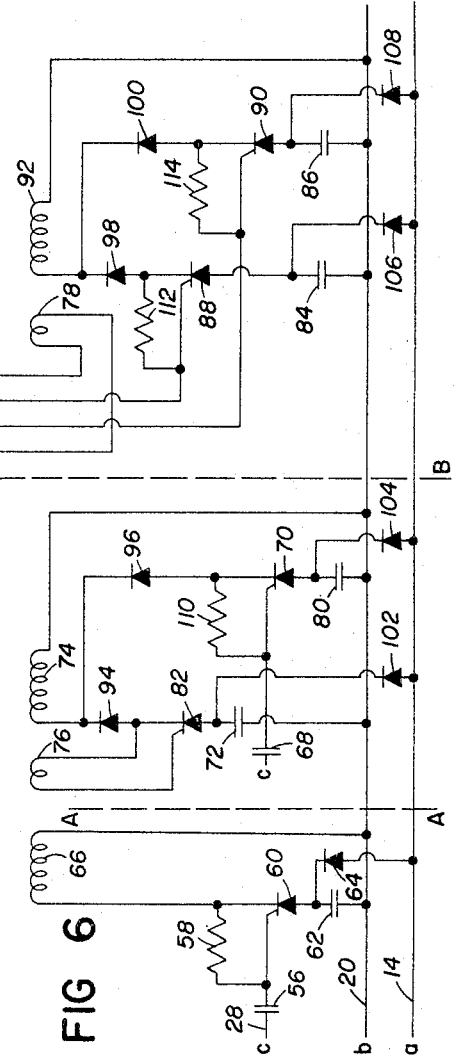
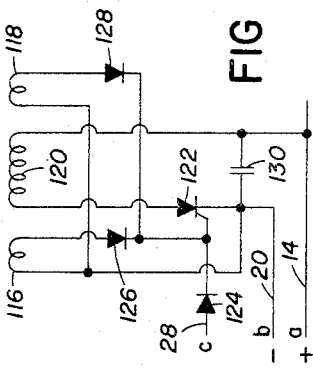
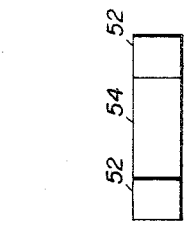

United States Patent Office 3,435,312
Patented Mar. 25, 1969

3,435,312
LINEAR MOTOR CONTROL SYSTEM
Frank A. De Coster, Cedar Rapids, Iowa, assignor to Douk's Experiment, Linn County, Iowa, a joint venture
Filed Feb. 14, 1966, Ser. No. 527,257
Int. Cl. H02k 33/18, 41/02
U.S. Cl. 318—130        14 Claims

ABSTRACT OF THE DISCLOSURE

Electromagnetic means for accelerating a paramagnetic projectile comprising at least first and second aligned coils. Movement of the paramagnetic object is operable to discharge a storage device through the second coil, thereby further accelerating the projectile.

---

This invention relates to means for imparting motion to an object and more particularly relates to electromagnetic means for imparting an initial velocity to an object and accelerating the object to a very high velocity.

The prior art discloses the basic principle of using electrical energy to move an object, such as a projectile, by momentarily energizing a coil to impart movement to the projectile through the magnetic field created by the energized coil. The prior art also discloses variations on this principle in which a plurality of coils are placed in line along the desired path of travel, each coil being successively energized in order to impart acceleration to the projectile as it passes from coil to coil. As is known to those skilled in the art, each coil must be energized only momentarily.

In applying this basic principle, I have determined that the ideal situation exists if the coil is energized at the precise time the object enters the coil and is de-energized at the precise time the object reaches the point in the coil where the acceleration vector is reversed. Continuing the current flow through the coil after the object reaches this point in the coil will slow down the object. I have further determined that a large amount of current must be "dumped" or switched into the coil almost instantaneously in order for the system to operate at a sufficient high efficiency to product practical results. This has not been satisfactorily accomplished in prior art devices because the methods and circuitry employed have been inadequate. In prior art devices, either switching could not be accomplished rapidly enough to achieve velocities sufficiently high for practical applications or the large amounts of current required would cause the switching means to burn out after minimal use. Therefore, in order to provide a commercially feasible means for launching and accelerating an object in this manner, a new means of applying and timing the pulses to an acceleration coil must be employed that will provide the necessary rapid switching for moving an object.

It is therefore a principal object of the invention to provide a new and improved means for imparting motion to an object by means of electrical energy.

It is another object of the invention to provide an improved means for imparting motion to an object by dumping or switching electrical energy pulses into a coil or coils. In accordance with this object, the invention provides means of creating an intense magnetic field by means of high energy current pulses. Such a field is necessary to accelerate an object to a high velocity. Moreover, the pulse is of such duration that a minimum of magnetic drag is exerted on the moving object by reason of de-energization of the coil after the object has reached the point in the coil where the acceleration vector is reversed.

It is a further object of the invention to provide improved means for launching and accelerating an object by utilizing a series of coils which are successively energized and de-energized rapidly in the properly timed sequence in order to impart the acceleration necessary for the object to attain a very high velocity.

It is a still further object of the invention to provide improved circuitry capable of developing the high energy pulses necessary to produce the high velocities required from a comparatively small source of electrical energy.

These and other objects and feateurs of the invention will be readily apparent from a consideration of the following description taken in connection with the accompanying drawings which disclose preferred embodiments of the invention and in which:

FIG. 5 is a view illustrating an object that has multiple accelerating segments;

FIG. 6 is a schematic wiring diagram of a circuit for imparting motion to an object having multiple accelerating segments; and FIG. 7 is a schematic wiring diagram of a circuit for imparting reciprocating movement to an object.

When I speak of an object herein, I am referring to any paramagnetic object. The object can be made of iron, for example, but I have found that the material "Permendur," which is a composition comprised basically of 50% iron, 48% cobalt, and 2% vanadium, produces better results. The shape and specific material of the object is not essential to operability of the invention. However, if a projectile design is what is desired, it preferably should be designed for the optimum ballistics performance.

Figure 1:
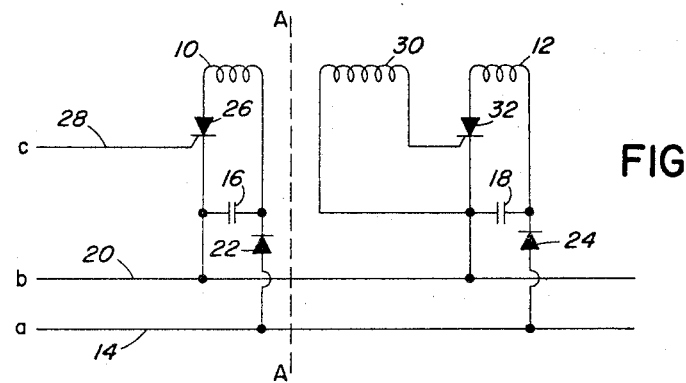
FIG. 1 is a schematic wiring diagram of the circuitry by means of which a single coil is pulsed at the desired time and which produces the properly timed pulses in a series of coils.

Referring first to FIG. 1 there is shown a schematic wiring diagram of the basic circuitry for launching and accelerating an object (from left to right of FIG. 1) according to the principles of the invention. For the purpose of illustration, there are shown schematically two coils 10 and 12 for accelerating the object. It will be understood, however, that in some cases a single coil may be sufficient to impart the desired velocity to an object, and that where higher velocities are required any number of coils may be employed by adding to the circuitry of FIG. 1 additional circuits identical to that portion of the circuit to the right of line A—A.

The pair of accelerating coils 10 and 12, the preferred construction of which is more fully described hereinafter, each have their positive side connected through diodes 22 and 24 to the positive side 14 of a suitable charging voltage source produced by the circuitry of FIG. 2 and described more fully hereinafter. A capacitor 16 or other energy storage dive is connected across the coil 10 through a switching control rectifier 26 or other suitable device which will rapidly switch from a non-conducting to a conducting state upon application to the device of an appropriate signal. As is known to those skilled in the art, a switching control rectifier is a three junction semi-conductor device which functions in the same manner as a thyratron tube; it requires only a very small energy pulse to be triggered but is capable of conducting very high current pulses when triggered. Similar to the circuit for coil 10, a capacitor or storage device 18 is connected across coil 12 through switching control rectifier 32. The negative side of each storage device 16 and 18 is connected to the negative side 20 of the charging voltage source. On the negative side of coil 10, between the coil 10 and the negative side of storage device 16, the gate of the switching control rectifier 26 is connected to a trigger source through line 28.

The diodes 22 and 24, being connected between storage devices 16 and 18, respectively, and the positive side of the voltage source serve to block any voltage return when the storage devices are discharged.

With the basic circuit arrangement described for coil 10, a single coil can be pulsed to impart motion to an object. When the switching control rectifier 26 is triggered from a source through line 28, the energy in the capacitor 16 will discharge through the switching control rectifier 26 into the coil 10. If an object is positioned with its leading end adjacent the negative side of coil 10, the pulse will rapidly accelerate the projectile into the coil 10. The projectile will continue to pass through the coil 10 at its attained velocity providing the pulse duration is such that the current flow in the coil 10 has stopped at the time the center of the object reaches the point in coil 10 where the acceleration vector is reversed. With the proper sizing of the storage device 16 and coil 10, the pulse of energy from the storage device 16 will be cut off at the correct instant; triggering of the switching control rectifier 26 has no effect on the length of the pulse. After discharge, the storage device 16 will be recharged from the charging voltage existing at lines 14 and 20, and thus, the circuitry is prepared for the launching of subsequent objects.

Although theoretically an object can be accelerated to a very high velocity by passing through a single coil, the velocity actually attainable is limited by the state of the art existing at a given time. In order to further accelerate an object to desired velocities within the present state of the art, I prefer to pass the object through one or more additional accelerating coils such as coil 12. For maximum efficiency, coil 12 must be energized prior to entry of the object into the coil and de-energized precisely at the time the object reaches the point in coil 12 where the acceleration vector is reversed. Because the object is moving at the velocity imparted to it by the first accelerating coil 10, timing of the pulse to coil 12 is critical. In order to accomplish the properly timed pulse of coil 12, I have provided a sensing coil 30 located between coils 10 and 12 along the path of travel of the object. Physically, the sensing coil 30 is located at the proper distance ahead of the accelerating coil 12 and in line with the coils 10 and 12 so that the object will pass by or through the windings of coil 30 close enough to induce a voltage in it. One side of coil 30 is connected to the gate of a switching control rectifier 32 which is connected on the negative side of the coil 12 as shown in FIG. 1. The other side of sensing coil 30 is connected to the cathode of the switching control rectifier 32. It is important that the direction of the winding and the polarity of the sensing coil be correlated to produce the proper pulse for triggering the switching control rectifier 32.

As indicated previously, the object must be paramagnetic, that is, made of a material that will retain magnetism for a short period of time. When the object passes through coil 10, it becomes magnetized. Therefore, as the object passes through or by the windings of sensing coil 30, it will induce sufficient voltage in coil 30 to trigger the switching control rectifier 32 by reason of the velocity and retained magnetism imparted to it by coil 10. Triggering of switching control rectifier 32 will cause the storage device 18 to discharge its entire energy into coil 12. Because of the physical location of sensing coil 30 relative to coil 12, passage of the paramagnetic object through or by coil 30 will cause the storage device 18 to discharge into coil 12 at the correct time.

By providing additional accelerating coils with sensing coils between them, and by properly sizing the energy storage devices, each additional coil will impart the same amount of energy to the object that was imparted by the preceding coil or coils. With a small object, a very high velocity can be obtained in a very short distance since the coils are not physically large. Also, with this arrangement, objects can be repeatedly launched since a charging voltage is continuously supplied to the circuitry. Of course, an initial energy source is required in order to trigger the first accelerating coil, but as has been described, the succeeding accelerating coils will be triggered by the movement of the object as it passes by or through the sensing coils.

Preferably, the voltage supplied to the basic accelerating circuitry is direct current. There are known to those skilled in the art, various ways of providing such a voltage, but in FIG. 2 I have shown one way of converting direct current to pulsating direct current. A low voltage source, such as battery 34 must be supplied and a potential from this source is converted as shown schematically in FIG. 2. The various values of the resistors and capacitors shown in FIG. 2 have been indicated in order to convert a six volt DC source to a 440 volt DC source from transformer 36.

In order to provide the low voltage necessary for the initial triggering of switching control rectifier 26, a resistor 40 provides for limiting the current into the gate of switching control rectifier 26. Switch 38, which is indicated as a push button switch but which can be any type, provides the trigger.

Figure 3:
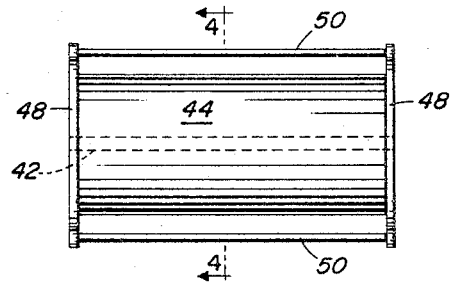
FIG. 3 is a side view of a preferred coil construction.
Figure 4:
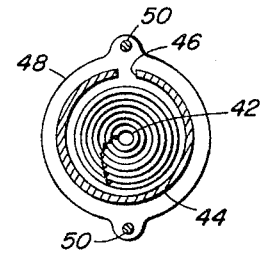
FIG. 4 is a sectional view through the coil of FIG. 3 and taken along line 4—4 of FIG. 3.

Referring now to FIGS. 3 and 4 suitable coil construction is shown by which coils 10 and 12 and any additional accelerating coils may be constructed. The windings are made upon a core (not shown) in such a manner that the core can be withdrawn in order to leave a longitudinal opening 42 through the coil which opening serves as a guide for the object to be accelerated. The coil is surrounded by a low reluctance magnetic material 44 which is provided with a longitudinal slot 46 along its entire length. End caps 48 are also provided and held together by connecting rods 50. The end caps 48 and cover 44 channel the magnetic field of the coil in order to provide the highest possible efficiency and thereby achieve the maximum acceleration of the object. The slot 46 also serves to increase the efficiency of the coil by minimizing the electrical current flow which would otherwise be induced in the cover and which would tend to create interferring fields that reduce efficiency.

There are many ways to improve the efficiency of the overall accelerating system particularly in the area of improved components and materials. For example, better and more efficient energy storage and switching devices will reduce losses in that part of the circuit and increase the accelerating force. Lower reluctance cover material and more complex cover design for the accelerating coils will increase the accelerating force and lower circuit losses. Also, any coil construction or material that reduces the electrical resistance of the coil winding will further improve the efficiency and increase the accelerating force applied to the object.

With regard to the object to be accelerated, the use of any paramagnetic material which has improved magnetic inductance will also increase the accelerating force.

Figure 2:
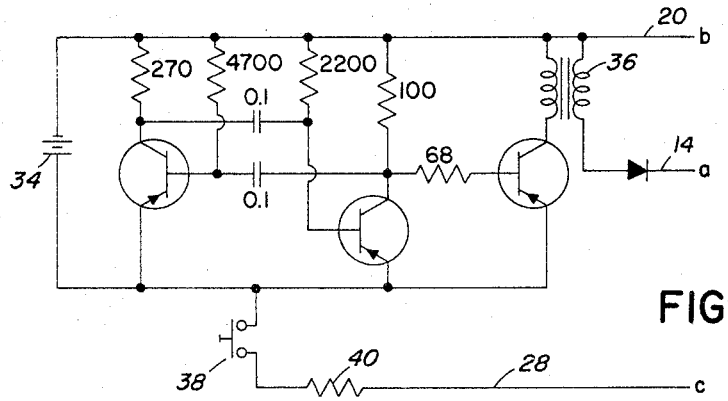
FIG. 2 is a schematic wiring diagram of a circuit by which the energy from a comparatively small energy source is utilized to charge the pulsing circuitry of FIG. 1.

An experimental model of the invention has been built employing two accelerating coils as described herein and shown in the circuitry of FIGS. 1 and 2 of the drawings. In this model, a six volt DC source was used, which source was converted to a 440 volt pulsating DC source from the transformer 36 by the circuit of FIG. 2 using components of the values indicated. Accelerating coils 10 and 12 each contained approximately 150 turns of No. 22 copper wire, and the capacitor 16 employed in the circuit with coil 10 had a value of 330 mfd. With a small object made of "Permendur" positioned with its leading end adjacent to the negative side of the coil 10, the switching control rectifier 26 was triggered by closing switch 38. This caused about 1000 amperes to be pulsed through the coil 10 in 500 microseconds. The object was rapidly accelerated by coil 10 and passed through the sensing coil 30. Because of the magnetism retained by the object, a voltage was induced in coil 30 sufficient to trigger the switching control rectifier 32 in circuit with accelerating coil 12. Because the object was traveling at an initial velocity imparted by the first accelerating coil 10, the pulse to coil 12 was of a shorter duration than the pulse to coil 10. In order to shorten the pulse, capacitor 18 of the experimental model was sized at approximately 240 mfd. By proper measurement, it was determined that in the experimental model, the projectile was accelerated by the second coil 12 approximately 40 to 50% of the velocity imparted by the first coil 10.

Theoretically, each additional accelerating coil will add the same amount of additional energy to the accelerating object. Assuming each coil is the same size and the same amplitude current pulse is available in each coil, the same force will be applied over the same distance. The product of this force times the distance over which it is exerted is the energy imparted to the accelerating object. By a well known law of physics, this energy is equal to one-half the mass of the accelerating object multiplied by its velocity squared. That is, four coils will double the velocity, nine will triple the velocity, sixteen will quadruple the velocity, etc.

One of the most interesting aspect of this multiple coil arrangement is that the efficiency of each succeeding coil is increased because it requires a shorter current pulse than the preceding coils, as previously explained. Since the coil losses are proportional to the current squared multiplied by the time that the current flows, there are lower losses for the shorter pulses. This effect is similar to the well established fact that the efficiency of a jet engine increases at higher speeds.

Another interesting aspect of this multiple coil arrangement is that the energy imparted by each succeeding coil may be increased because the shorter duration of time in each coil allows pulses of higher and higher intensity, thereby increasing the total amount of energy that may be imparted to the object.

Moreover, since the energy transfer medium is the magnetic (electro-magnetic) field, force will be exerted on the accelerating object at any velocity, and it therefore is theoretically possible to accelerate an object to ultimate velocities approaching the speed of light.

Where additional accelerating force is necessary or desirable, a long slender object can be provided with two or more accelerating segments 52 as shown in FIG. 5. The accelerating segments 52 would be made of paramagnetic material and they would be separated by a segment 54 of diamagnetic material.

FIG. 6 shows a circuit of multiple accelerating coils that might be used to accelerate such a multiple-segment object. This circuit contains three accelerating coils, each within a distinct circuit arrangement. Generally, for imparting motion to a multiple segment object with N segments, there will be $N+1$ accelerating coil circuit arrangements, although fewer coil arrangements could be used with somewhat reduced coil utilization.

The portion of FIG. 6 to the left of dotted line A—A is the same essentially as the circuit employed in the arrangement of FIG. 1 except the trigger input is now capacitor coupled through capacitor 56, and the circuit has been rearranged to provide for isolation of the trigger pulses as more fully described hereinafter. Resistor 58 is used to stabilize the gate-cathode voltage of the switching control rectifier 60.

As previously described with reference to the circuit of FIG. 1, prior to accelerating an object, the storage device shown as capacitor 62 is charged through lines 14 and 20 from a suitable charging source through isolation diode 64. When acceleration is desired, a trigger pulse is sent through capacitor 56 and the storage device 62 is discharged through the switching control rectifier 60 into the accelerating coil 66.

At the same instant that accelerating coil 66 is pulsed, the trigger pulse is also coupled through capacitor 68 into switching device 70 to discharge storage device 80 into second accelerating coil 74. If the object is properly positioned with a paramagnetic segment 52 adjacent the negative side of each accelerating coil 66 and 74, an accelerating force will be applied to both segments 52 simultaneously.

As the object is accelerated, the two segments 52 will simultaneously induce a small voltage into sensing coils 76 and 78 causing storage device 72 to be discharged through switching device 82 into coil 74 and causing either storage device 84 or 86 to be discharged through switching device 88 or 90, respectively, into the third accelerating coil 92. This provides another dual burst of accelerating force.

As the object continues to accelerate and as the trailing segment 52 approaches the sensing coil 78, the remaining charged storage device 84 or 86 will be discharged into the third accelerating coil 92 to provide an additional accelerating force.

The diodes 94 and 96, and 98 and 100, are isolation diodes to prevent interference between the storage devices 72 and 80 and 84 and 86, respectively, which are connected in pairs to the same accelerating coil, either coil 74 or 92. Also, diodes 102, 104, 106 and 108 are blocking diodes which serve to block any voltage return when the respective storage device is discharged.

Resistors 110, 112 and 114 are stabilizing resistors which function to stabilize the gate-cathode voltage of the respective switching devices.

The circuit shown in FIG. 6 above dotted line C—C is a bistable circuit well known to those skilled in the art and is used to steer trigger pulses to either switching device 88 or 90. These pulses may be discharged in a selected or random order depending upon the exact design of the steering circuit.

The circuitry to the right of dotted line B—B may be repeated for each additional accelerating coil desired for a two segmented object. Extension of the above description to a three, four or more segmented object is self-evident to those skilled in the art.

The principles of the invention may also be applied to generate reciprocating motion of an object by adding a second sensing coil to a single accelerating coil as shown in FIG. 7. The sensing coils 116 and 118 are located at opposite ends of the accelerating coil 120, and when a small voltage is induced in either sensing coil, the switching device 122 will be triggered. Diodes 124, 126 and 128 function to isolate the trigger pulses from either one of the sensing coils 116 and 118 or from a starting trigger source. The storage device 130 functions as previously described in the other circuits.

In operation of the circuit of FIG. 7, a pulse through line 28 from a starting trigger source causes the object to accelerate toward the opposite end of the coil 120 from the end where it initially rested. As the object tends to emerge from either end of the coil 120, it triggers the switching device 122 through the sensing coil 116 or 118 and the accelerating force and motion of the object is reversed. A "hard" charging source, i.e., one that is capable of supplying large currents, is needed for this circuitry since the capacitor 130 will have only a very short time to charge.

It would also be possible to control the speed of the reciprocating motion by adjusting the charging source potential, supplying external triggers, moving the sensing coils or all three.

From the above description, it is evident that the principles of the invention can be applied to any situation where it is desired to impart motion to an object. In some cases, a single accelerating coil may be all that is needed to attain the desired velocity of an object. It is anticipated that in some applications, much higher charging voltages will be required and that multiple accelerating coils will be used. There may be further advances and improvements in the general state of art, in wire composition and design, coil making, energy storage devices, or switching devices, and improved paramagnetic materials may be discovered or developed which have higher saturation capabilities. Any of these improvements or advances will increase the efficiency of the invention and permit acceleration of objects to velocities approaching the theoretical maximum. Moreover, it is obvious that revisions and modifications can be made by those skilled in the art to the illustrated embodiments of the invention without departing from the spirit and scope of the invention. It is my intention, however, that any such applications of the principles of my invention and all revisions or modifications thereto which are obvious to those skilled in the art will be included within the scope of the following claims.

I claim:

1. Electromagnetic means for imparting motion to a paramagnetic object, said means comprising a first coil, an electrical energy storage means connected across said first coil, a source of electrical energy connected to said storage means for charging said storage means, a three terminal semiconductor device for rapidly closing and opening the circuit between said storage means and said first coil to discharge said storage means through said first coil when said device is triggered and said circuit thereby closed, and a second coil physically aligned with said first coil, one side of said second coil being connected to the negative terminal of said device and the other side being connected to the control terminal of said device so that a voltage induced in said second coil by movement of said object thereby will trigger said device, whereby said device will momentarily conduct a high current from said storage means to said first coil when said device is triggered by a voltage from said second coil.

2. Electro-magnetic means for imparting motion to a paramagnetic object and accelerating the object to a high velocity, said means comprising first and second accelerating coils, said coils being aligned to provide for movement of said object through their magnetic fields, an electrical energy storage means connected across each of said coils, a source of electrical energy connected to each of said storage means for charging said storage means, and switch means combined with each of said coils for rapidly closing and opening the circuit between the storage means and the coil across which it is connected to discharge the storage means through the coil when the circuit is closed, the switch means for said second coil being operated by movement of said object from said first coil to said second coil.

3. The electro-magnetic means of claim 2 in which a single source of electrical energy is connected to both of said storage means, and means is provided between each said storage means and said energy source for blocking return voltage to the other of said coils when a storage means discharges into the coil across which it is connected.

4. The electro-magnetic means of claim 2 in which the switch means for said first and second accelerating coils each includes a multi-terminal device that when triggered will control electrically the starting of a current flow to the coil to which it is connected, and a voltage source is connected to each of said devices in such a way that the device will momentarily conduct a high current from the storage means to the coil in circuit with which it is connected when the device is triggered from its voltage source.

5. The electro-magnetic means of claim 4 in which the source of voltage for triggering the said device combined with the second accelerating coil includes a sensing coil connected between the storage means and the control terminal of said device so that a voltage induced in said sensing coil will trigger said device, said sensing coil being aligned with and located between said first and second accelerating coils so that the magnetic field of said object will pass through said sensing coil to induce a voltage in said sensing coil as the object moves from the first accelerating coil to the second accelerating coil.

6. The electro-magnetic means of claim 5 in which the said device combined with the second accelerating coil is a three-terminal semiconductor device having a negative, a positive, and a control terminal, said device being connected to said second accelerating coil, and said sensing coil being connected at one end to said negative terminal and at the other end to said control terminal.

7. Electro-magnetic means for imparting motion to an elongated object having two segments of paramagnetic material spaced-apart along its axis and accelerating the object to a high velocity, said means comprising a first accelerating coil, an electrical energy storage device connected across said coil, a second accelerating coil, a pair of electrical energy storage devices each connected across said second accelerating coil, a third accelerating coil, a pair of electrical storage devices each connected across said third accelerating coil, said accelerating coils being aligned to provide for movement of said object through their magnetic fields, a source of electrical energy connected to each of said storage devices for charging said devices, switch means in circuit between each of said storage devices and its respective accelerating coil for closing and opening the circuit to allow for discharge of one of said devices through its respective coil when the circuit is closed by said switch means, means to isolate the discharge of a storage device only into the coil across which it is connected, trigger means combined with each of said switch means for momentarily closing the circuit between a storage device and a coil, first means for simultaneously actuating the trigger means for said first accelerating coil and one of the trigger means for said second accelerating coil to cause the respective storage devices to discharge through said first and second coils simultaneously, second means operable by movement of said object for simultaneously actuating the other trigger means for said second accelerating coil and one of the trigger means for said third accelerating coil prior to the time the segments of said object enter said second and third coils, and third means operable by movement of said object for actuating the other trigger means for said third accelerating coil prior to the time the trailing segment of said object enters said third coil.

8. The electro-magnetic means of claim 7 in which a single source of electrical energy is connected to all of said storage devices, and means is provided between each storage device and said energy source for blocking return voltage to another of said accelerating coils when a storage device discharges into the coil across which it is connected.

9. The electro-magnetic means of claim 7 in which each of the said switch means includes a multi-terminal device that when triggered will control electrically the starting of a current flow to the coil to which it is connected, and said trigger means for each of said switch means includes a voltage source connected to each of said multi-terminal devices in such a way that said multi-terminal device will momentarily conduct a high current from the storage device to the coil in circuit with which said multi-terminal device is connected when it is triggered from its voltage source.

10. The electro-magnetic means of claim 9 in which the source of voltage for triggering one of the multi-terminal devices combined with said second accelerating coil and both of the multi-terminal devices combined with said third accelerating coil includes a sensing coil connected between the control terminal of each such multi-terminal device and its respective storage device so that a voltage induced in a sensing coil will trigger the multi-terminal device to which it is connected, one of said sensing coils being aligned with and located between said first and second accelerating coils and another of said sensing coils being aligned with and located between said second and third accelerating coils so that the magnetic field of said object will pass through said sensing coils to induce a voltage therein as the object moves between the accelerating coils.

11. Electro-magnetic means for imparting reciprocating motion to a paramagnetic object, said means comprising an accelerating coil, an electrical energy storage means connected across said coil, a source of electrical energy connected to said storage means for charging said storage means, switch means in circuit between said coil and said storage means and operable to momentarily close and open said circuit, and trigger means at each end of said coil and actuatable by movement of said object to operate said switch means.

12. The electro-magnetic means of claim 11 in which said switch means includes a multi-terminal device that when triggered will control electrically the starting of a current flow to the said coil, and the trigger means at each end of said coil is connected to said device in such a way that the multi-terminal device will momentarily conduct a high current from the storage means to the coil when the device is triggered by actuation of either of said trigger means.

13. The electro-magnetic means of claim 12 in which said device is a three-terminal semiconductor device having a cathode, an anode and a control terminal.

14. The electro-magnetic means of claim 13 in which each of said trigger means includes a sensing coil aligned with said accelerating coil so that the magnetic field of said object will pass through the sensing coil as it moves away from the accelerating coil, each of said sensing coils having one side connected to the cathode of said device and the other side connected to the control terminal of said device.

References Cited

UNITED STATES PATENTS

| | | |
|---|---|---|
| 2,150,440 | 3/1939 | Hargreaves. |
| 2,922,175 | 1/1960 | De Villiers et al. __ 310—35 XR |
| 2,958,025 | 10/1960 | De Villiers et al. _____ 318—135 |
| 3,147,419 | 9/1964 | Cope _____ 318—129 |
| 3,179,867 | 4/1965 | Delgado _____ 318—135 |
| 3,215,916 | 11/1965 | Hermann _____ 318—129 XR |
| 3,345,546 | 10/1967 | Beltramo _____ 318—132 |
| 2,892,140 | 6/1959 | Praeg _____ 318—132 X |
| 3,118,383 | 1/1964 | Woodward _____ 318—130 X |

MILTON O. HIRSHFIELD, *Primary Examiner.*

D. F. DUGGAN, *Assistant Examiner.*

U.S. Cl. X.R.

310—14; 318—132, 135